UNITED STATES PATENT OFFICE.

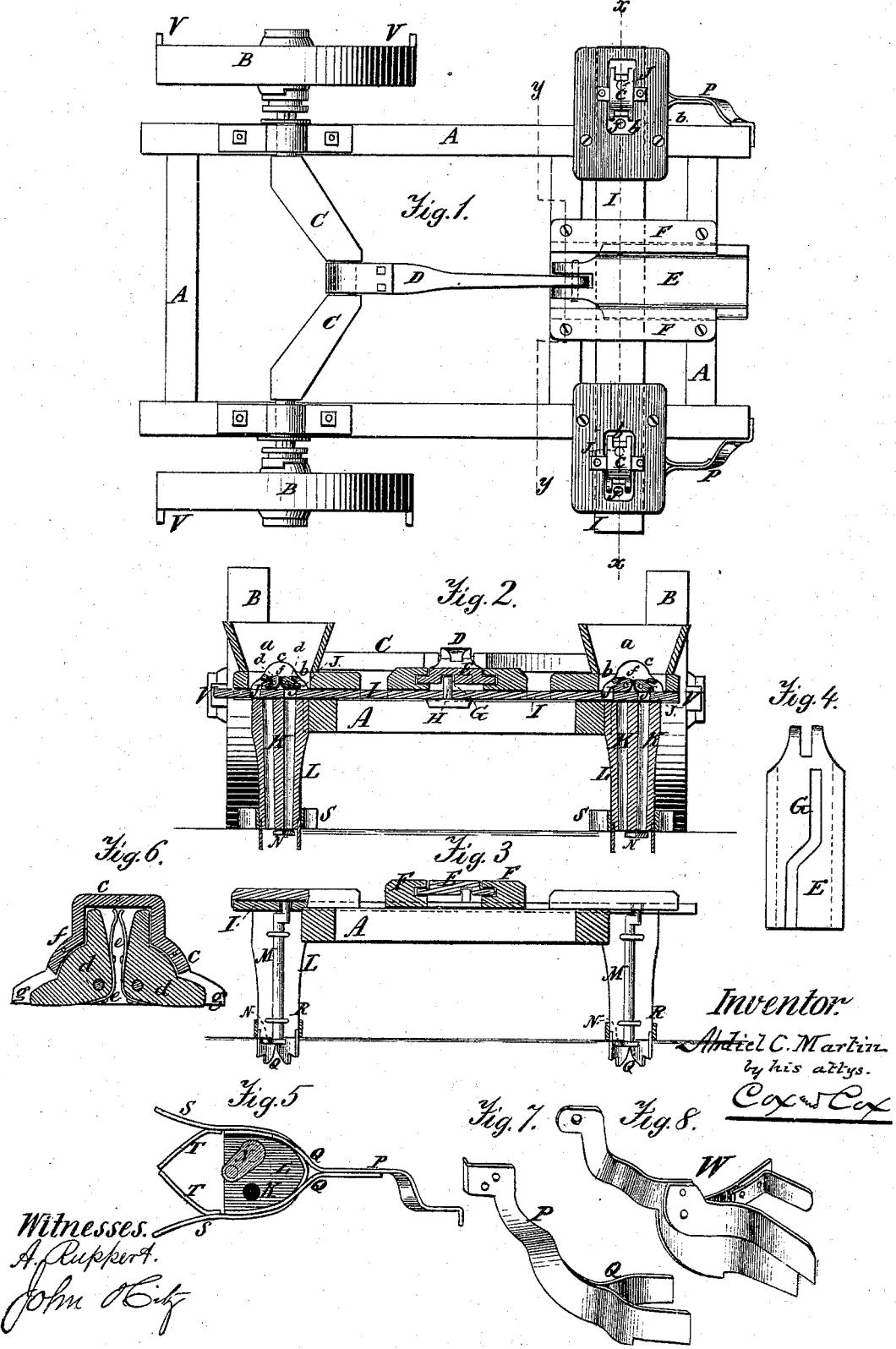

ABDIEL C. MARTIN, OF WADDAMS CENTRE, ILLINOIS.

IMPROVEMENT IN CORN-PLANTERS.

Specification forming part of Letters Patent No. 137,700, dated April 8, 1873; application filed September 28, 1872.

*To all whom it may concern:*

Be it known that I, ABDIEL C. MARTIN, of the town of Waddams Centre, in the county of Stephenson and State of Illinois, have made and invented a new and useful Improvement in Corn-Planters, of which the following is a specification:

Nature and Objects of the Invention.

This invention relates to new and useful improvements in wheel corn-planters; and consists of a dropping-slide operated by a driving-slide driven by a pitman attached to a crank-shaft, which is driven by the riding-wheels of the planter, said driving-slide having a serpentine groove in its under side, which receives a stud upon the face of the dropping-slide, and gives the latter a shuttle motion between two double corn-conductors, each provided with a rock-valve or dropper arranged to open and close, alternately, the tubes of the conductor, the object being to drop two rows of corn in hills simultaneously and automatically. My invention further consists of a combined track-clearer and corn-coverer, composed of a steel shoe having a long covered shank attached to the frame of the machine, so as to curve and permit the shoe to receive and protect the shank of the corn-conductor, in combination with a corn-coverer, composed of two wings, each comprising an outward and an inward curve secured to the shank of the track-clearer, so as to partially encircle the shank of the corn-conductor, the object of this part of the invention being to clear the track, mark and regulate the depth of the furrow, and to cover the corn after it has been dropped into the furrow. My invention further consists in providing the driving-wheels of the planter with check-arms attached to the outer edges of the periphery of the wheels, diametrically opposed one to the other, and so arranged, in relation to the dropping-slide, as to mark upon the surface of the soil at the time each hill is deposited, and directly in line therewith laterally, the object of this arrangement being that of dispensing with any marker other than these check-arms or markers. My invention further consists of a cut-off, composed of two triangular-shaped valves provided with springs, and pivoted within a case, in combination with the corn-box and the dropping-slide of the machine, for the purpose of regulating the flow of seed from the corn-box.

Description of the Accompanying Drawing.

Figure 1 is a plan view of a device embodying my invention. Fig. 2 is a sectional view on the line $x\ x$. Fig. 3 is the same on the line $y\ y$. Fig. 4 is a bottom view of the slide E. Fig. 5 is a bottom view of the conductor L. Fig. 6 is a sectional view of the cut-off. Fig. 7 is a view of the clearer and coverer. Fig. 8 is a view of the coverer W.

General Description.

The frame A is mounted at the rear upon driving-wheels B B provided with clutch-gearing operated by levers appropriately arranged upon the frame so as to throw either or both of the wheels in and out of gear when desired. The wheels B B when in gear operate a crank-axle, C, the ends of which form its bearings. A connecting-rod is secured to the crank-axle C, and also to the driving-slide E working in guides F, and provided on its under side with the angular groove G, which receives and works upon the stud H upon the upper surface of the dropping-slide I, which is provided with the valve-openings J. The movement of the driving-slide E imparts to the dropping-slide I a vibratory movement, alternately opening and closing the tubes K. At the same time the rock-shaft M, provided at its lower extremity with the valve N, is operated, and alternately opens and closes the bottom of one of the tubes K on one side of the device. The hoppers or corn-boxes $a$ are placed at each side of the device immediately over the tubes K, and have each placed within them the cut-off, Fig. 6, which consists of two oscillating lips, $d$, pivoted at their angles to the box $c$ of the cut-off. These lips $d$ are provided with a bowed spring, $e$, the upper ends of which impinge, and thus give the outer lower foot of the lips a downward bearing, bringing the lower surface of foot in contact with the upper surface of the slide I, and operating as a cut-off as the slide moves to prevent the aperture J becoming choked.

The combined track-clearer and coverer is secured through the shank P to the front of the machine, curves down, and the bifurcation or shoe Q at its bottom projects below and receives the foot of the shank R of the conductor. The coverer, composed of the arms S curved outwardly, and the arms T secured to the arms S and curved inwardly, is secured to the shank P, just above the shoe Q, and partially encircles the shank L of the conductor. The cranks of the rock-shaft M have bearings in the dropping-slide I. The bottom of the corn-box $a$ is provided with a slot, $b$, in which the cut-off $c$ is secured so that the bottom of the cut-off $c$ comes in contact with the top of the dropping-slide I, which operates the valves $d\ d$ provided with springs $e\ e$ and pivoted in the case $f$. There are spaces $g\ g$ between the ends of the case $f$, which come in contact with the ends of the corn-box $a$ and the ends of the valves $d\ d$; and through these spaces $g\ g$ the corn falls into the openings J J in the dropping-slide I.

When the machine is in operation the openings J J pass under the valves $d\ d$ and discharge the corn into the tubes K K, and on returning to the spaces $g\ g$ are again filled. Check-arms or markers V are placed upon the edges of the peripheries of the wheels B B diametrically opposed one to the other. The distance of the wheels B B from the bottoms of the tubes K K is such that one half-revolution of the wheels causes the marker V to mark the exact distance between the hills, each mark being in a direct lateral line with a hill. A separate coverer, W, may be attached to the shank L immediately above the shoe Q and used with a single track-clearer.

Operation.

Corn is placed in a receiver immediately over the valve-openings J in the dropping-slide I. The machine is then driven across the field, and one half-revolution of the wheels B B throws the dropping-slide I to one side and drops two hills of corn, one in each row, the track having been previously cleared by the track-clearer and the furrow marked out by the shoe Q. The coverer O then follows and covers the corn, and the check-arms V mark in a direct lateral line from the point where each hill is deposited. The next half-revolution of the wheels B B plants two more hills, and so on. The rock-shafts M rock the valves N from side to side, leaving only one tube, K, in each conductor open at a time. When the opposite side of the field has been reached the wheels should be thrown out of gear before attempting to turn around. The wheels will then revolve without operating the machine. After turning around, set the heel of the shoe Q in a direct lateral line with the last mark made by the marker V previous to turning around. Throw one wheel, B, in gear and revolve it until the machine has dropped one hill in each row—that is, one half-revolution—after which both wheels should be thrown in gear and the machine driven back across the field. The markers V on the wheels B B obviate the necessity of any other mark or indication to go by.

Claims.

Having thus described my invention, what I claim as new, and desire to secure by Letters Patent, is—

The dropping-slide I, in combination with the driving-slide E provided with the angular groove G and driven by a pitman, D, attached to the crank-shaft C, substantially as shown and described.

In testimony that I claim the foregoing improvement in corn-planters, as above described, I have hereunto set my hand and seal this 2d day of September, 1872.

ABDIEL C. MARTIN. [L. S.]

Witnesses:
 ROBERT FERGUSON,
 W. A. ROBEY.